United States Patent [19]

Tanitomi

[11] Patent Number: 5,350,895
[45] Date of Patent: Sep. 27, 1994

[54] POWER PROPELLED WELDING DEVICE

[75] Inventor: Fuminao Tanitomi, Ueki, Japan

[73] Assignee: Yugen Kaisha Kaisei Shoko, Ueki, Japan

[21] Appl. No.: 886,696

[22] Filed: May 20, 1992

[30] Foreign Application Priority Data

| May 21, 1991 | [JP] | Japan | 3-145632 |
| Jun. 12, 1991 | [JP] | Japan | 3-167703 |
| Oct. 22, 1991 | [JP] | Japan | 3-167704 |
| Oct. 22, 1991 | [JP] | Japan | 3-302320 |
| Apr. 28, 1992 | [JP] | Japan | 4-136364 |

[51] Int. Cl.$^5$ .............................. B23K 9/12
[52] U.S. Cl. .................. 219/124.31; 219/125.1
[58] Field of Search ............ 219/124.31, 124.22, 219/125.1, 136, 73

[56] References Cited

U.S. PATENT DOCUMENTS

| 2,836,704 | 5/1958 | Mason | 219/124.31 |
| 3,167,636 | 1/1965 | Bosteels | 219/124.22 |
| 3,444,352 | 5/1969 | Ogden et al. | 219/73 |
| 3,670,139 | 6/1972 | Pandjiris et al. | 219/136 |
| 3,704,822 | 12/1972 | Nomura | 219/124.22 |
| 3,779,444 | 12/1973 | Kensrue | 219/124.31 |
| 3,937,918 | 2/1976 | Robertson | 219/124.31 |

*Primary Examiner*—Clifford C. Shaw
*Attorney, Agent, or Firm*—Thomas R. Morrison

[57] ABSTRACT

The present invention comprises weld units A, A' which move on a bottom plate 101 along standing plates 102, moving tables B which hold cables 6 extending from said welding units A, A', detectors C, C' which detect moving directions of the welding units A, A', and a control circuit part D which controls motors 32, 35 so as to cause the X-Y tables B to move and follow the movings of the welding units A, A' by signals issued from the detectors C, C'. Therefore, when the motors 2 are driven to rotate rollers 4, the welding units A perform the weldings on connecting parts (a) between the standing plates 102 and a bottom plate 101 while the welding units A move along the standing plates 102. The detectors detect the moving directions of the welding units A, and are controlled by signals issued from the detectors so as to cause the cables 6 to follow the welding units A, while the moving tables B follows the welding units A.

17 Claims, 15 Drawing Sheets

POWER PROPELLED WELDING DEVICE

TECHNICAL FIELD

This invention relates to a welding unit, and more particularly to welding unit for automatically welding a bottom plate and standing plates.

BACKGROUND OF THE INVENTION

In general, welding operations have been carried out by operators holding torches or electrodes. Since weldings are hard work, the operators are often affected at eyes or waists, and there have conventionally been proposed many kinds of automatic welding apparatuses therefor.

OBJECTS AND SUMMARY OF THE INVENTION

However, the automatic welding apparatuses are very expensive since those are controlled by computers, and in addition, programs have had to be designed in accordance with objects to be welded.

In technical fields of building structures, including hydraulic structures, shipbuildings and the like, there are very often weldings of bottom plates and standing plates structured in latticings at straight-line parts. The straight-line parts vary in length, and it is very troublesome to reprogram the computers each time for different lengths Accordingly, the automatic welding apparatuses to be computer controlled have not been employed for the welding the bottom plates and the standing plate.

Thus, it is an object of the invention to provide a simple welding means for automatically welding the bottom plates and the standing plates.

The present invention comprises rollers which contact the standing plates and rotate horizontally, a pushing means which urges the rollers against the standing plates, wheels which run on the bottom plate, torches which carry out weldings at connecting parts between the bottom plate and the standing plates, and motors which drive the rollers to cause the torches to move along the connecting parts.

According to the above stated structure, when the motors are driven to rotate the motors, welding units perform the weldings on the connecting parts between the bottom plate and the standing plates while along the standing plates. A detector detects moving direction of movement of the welding units. Moving tables are controlled by detecting signals issued therefrom and cause cables to follow the welding units, while the moving tables move, pursuing the welding units.

Figure 1:
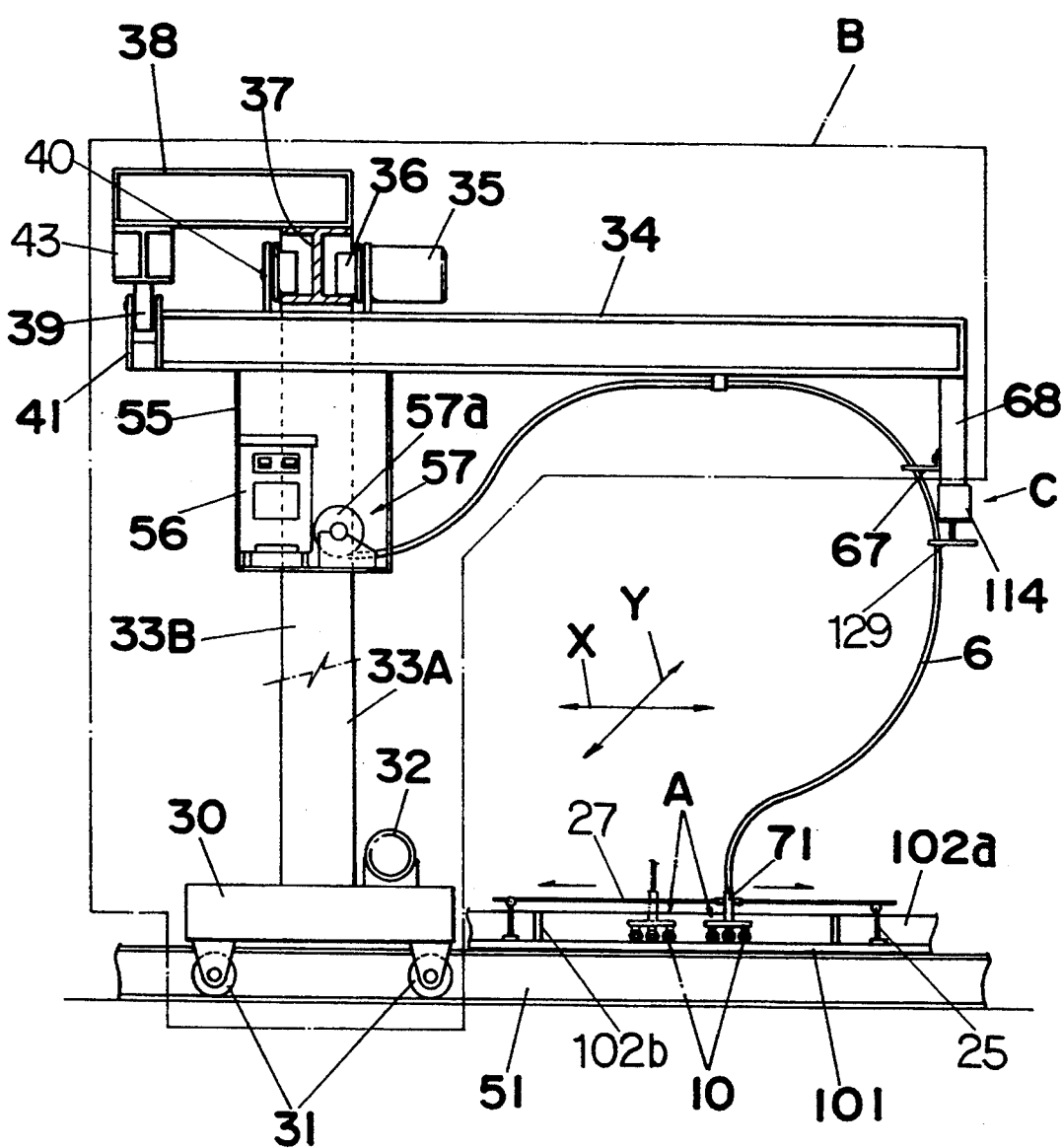
FIG. 1 is a side view of a welding apparatus according to the present invention.

In the drawings, A and A' are the welding units; B are X-Y tables; C and C' are detectors; D are a control circuit part; 2 and 213 are motors; 4 and 219 are rollers; 6 is cables; 10 is wheels; 12 is torches; 32 and 35 are motors; 25, 26, 27 and 28 are guide means; and 20, 271 and 218 are pushing means.

DETAILED DESCRIPTION OF THE PREFERRED EMBODIMENT

Embodiments of the present invention will be explained referring to the attached drawings.

Figure 2:
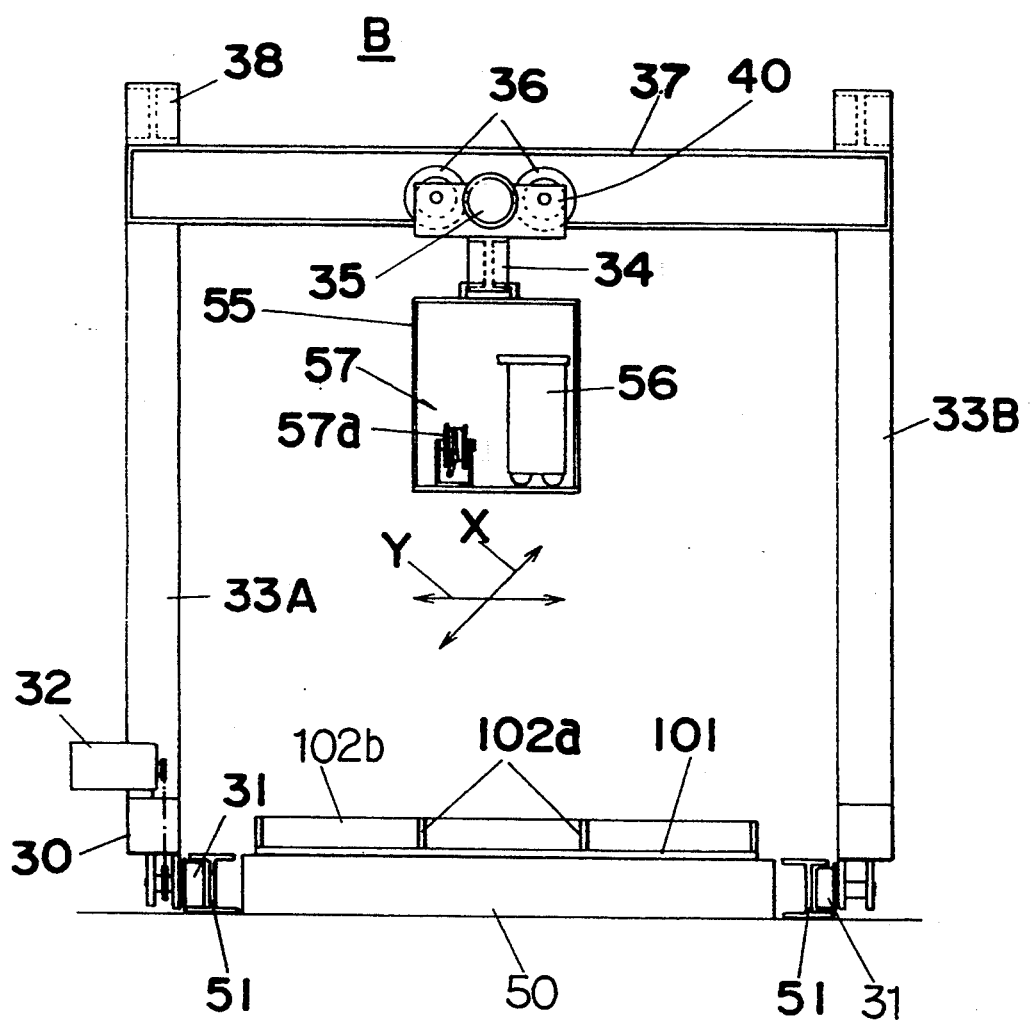
FIG. 2 is a front view of the welding apparatus of this invention.
Figure 3:
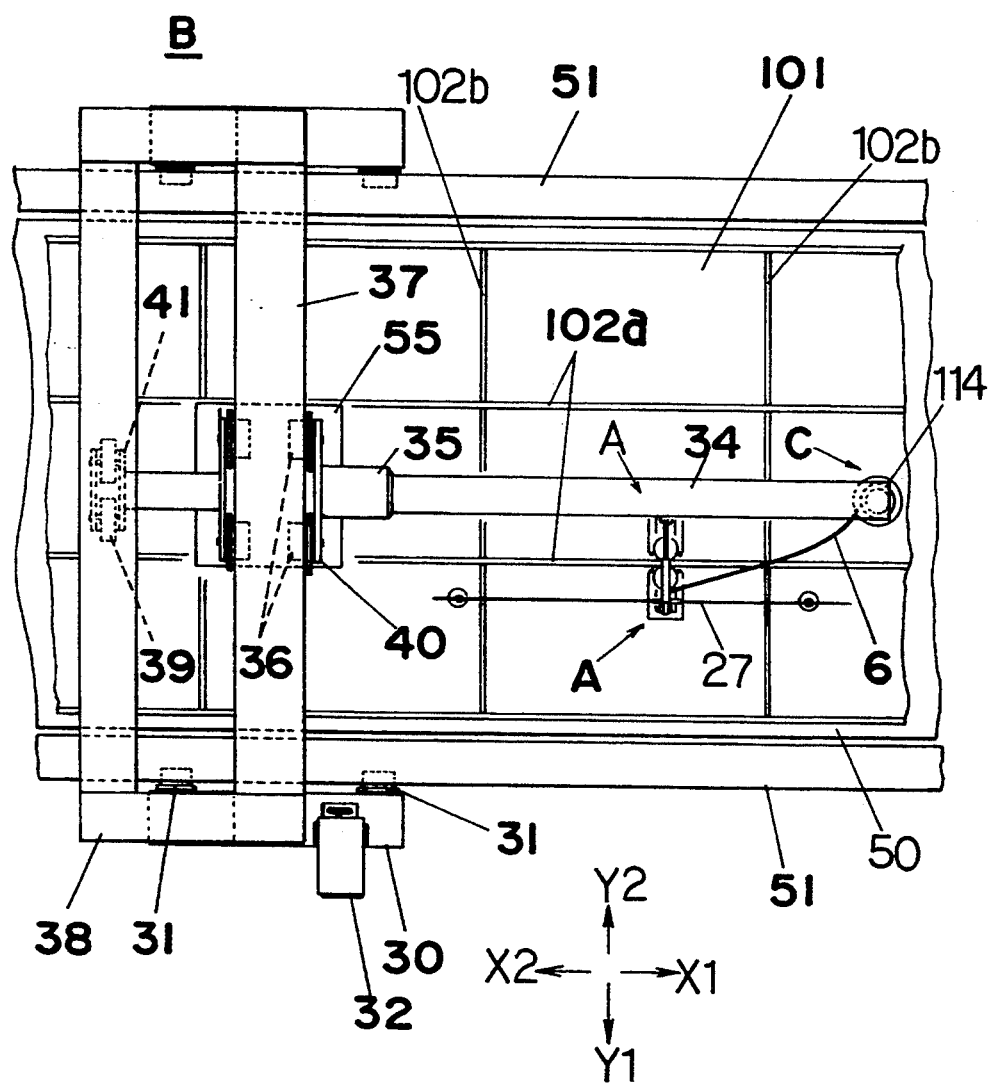
FIG. 3 is a plan view of the welding apparatus of this invention.

FIG. 1 is the side view of the welding apparatus, FIG. 2 is the front view of the same, and FIG. 3 is the plan view thereof. The instant welding apparatus comprises the two welding units A (see in particular FIG. 3), the X-Y tables B as the moving tables supporting the cables 6 extending from the welding units A, and the detectors C for detecting the moving directions of the units A. The welding units A, as later stated, automatically weld the connecting parts between the bottom plate 101 and the standing plates 102 (102a, 102b) which run atop the bottom plate 101. The reference numeral 102a designates the standing plate in an X direction, and the reference numeral 102b designates the standing plate in a Y direction. The X-Y tables B cause the cables 6 to follow the welding units A which move in the horizontal direction.

The welding units A will be explained with respect to detailed structures thereof, referring to FIGS. 4 to 6.

There are disposed the two welding units A of the same structure at both sides of standing plates 102. Plate-shaped base members 1 are provided, at rear sides, with motors 2 enclosed in cylindrical cases 8 and switches 14 for switching ON-OFF of the motors 2. The motors 2 are connected to electric codes 13 which are inserted into the cables 6 (see FIG. 1).

The base members 1 are provided, at front parts, with ring shaped receipts 3 mounted with rollers 4 thereon. As shown in FIGS. 5 and 6, the standing plate 102a is chucked between the roller 4 of the left welding unit A and the roller 4 of the right welding unit A. Gears 5 are defined under the rollers 4, while gears 7, 7a are housed within cover cases 15. When the motors 2 are driven, the gears 5, 7, 7a are rotated, and the rollers 4 are rotated horizontally. Guiding rollers 9 are pivoted at the corners of the base members 1 for pushing against the standing plate 102a. Wheels 10 grounding on the bottom plate 101 are furnished on the underside of the base members 1. Accordingly, when the motors 2 are driven, the welding units A move in the X direction on the bottom plate 101 along the standing plate 102a. It is also possible to move the welding units A by driving the wheels 10 by the motors 2. The base members 1 are provided with limit switches 11 at the both sides thereof, and when the limit switches 11 contact the standing plate 102b in the Y direction, the motors 2 and torches (later mentioned) stop.

Torches 12 pass through centers of the rollers 4. As seen in FIG. 5, front ends 12a of the torches 12 face the connecting parts (a) between the bottom plate 101 and the standing plate 102a for welding the connecting parts (a). By passing the torches through the centers of the rollers 4, the welding units A may be structured in compact sizes. Welding electrodes 17 project from the front ends 12a of the torches 12. The electrodes 17 are inserted into the cables 6 together with the electric codes 13. The torches 12 are attached to the cover cases 15 by means of attaching members 103.

Figure 4:
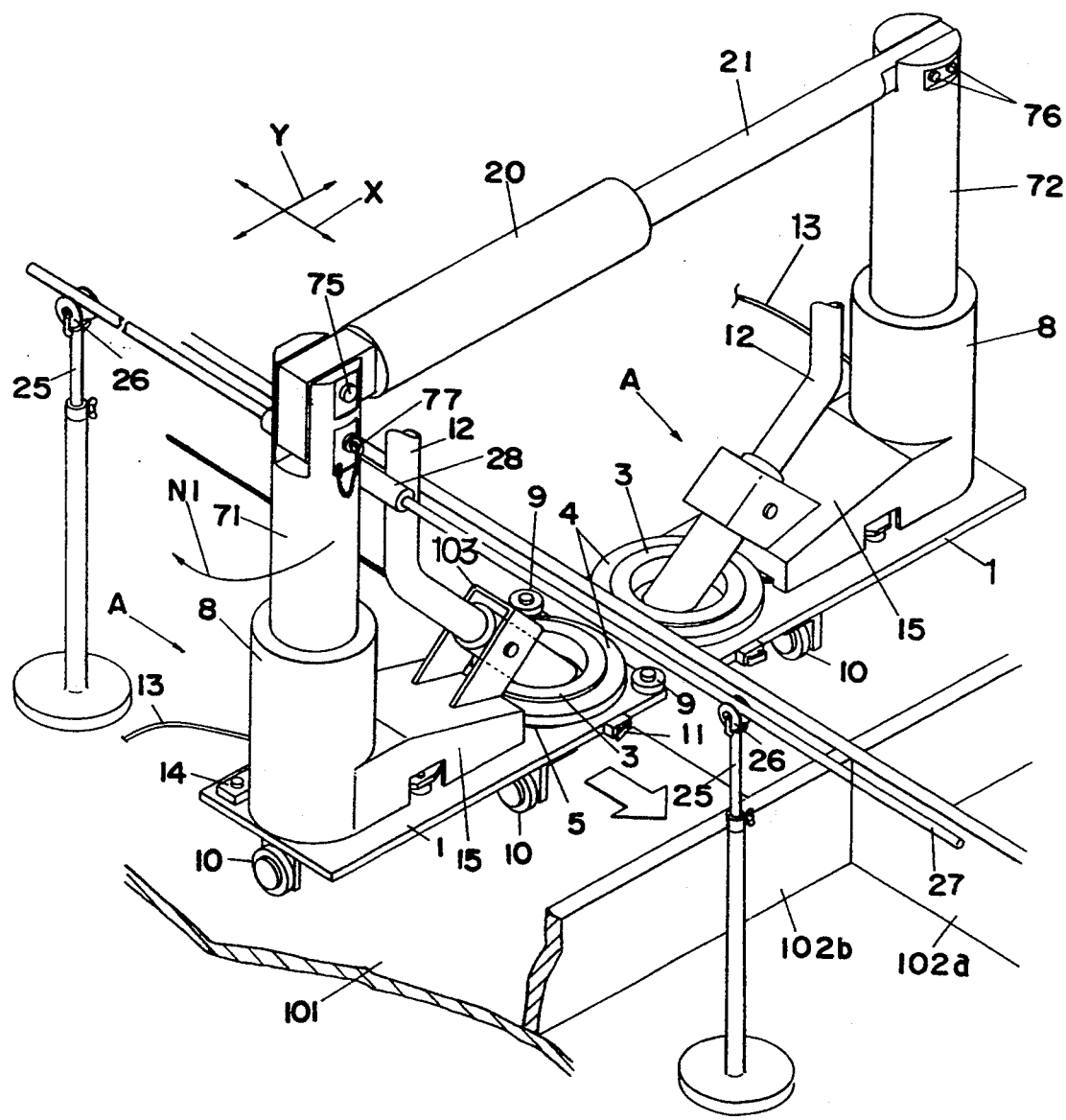
FIG. 4 is perspective views of welding units of the invention.
Figure 5:
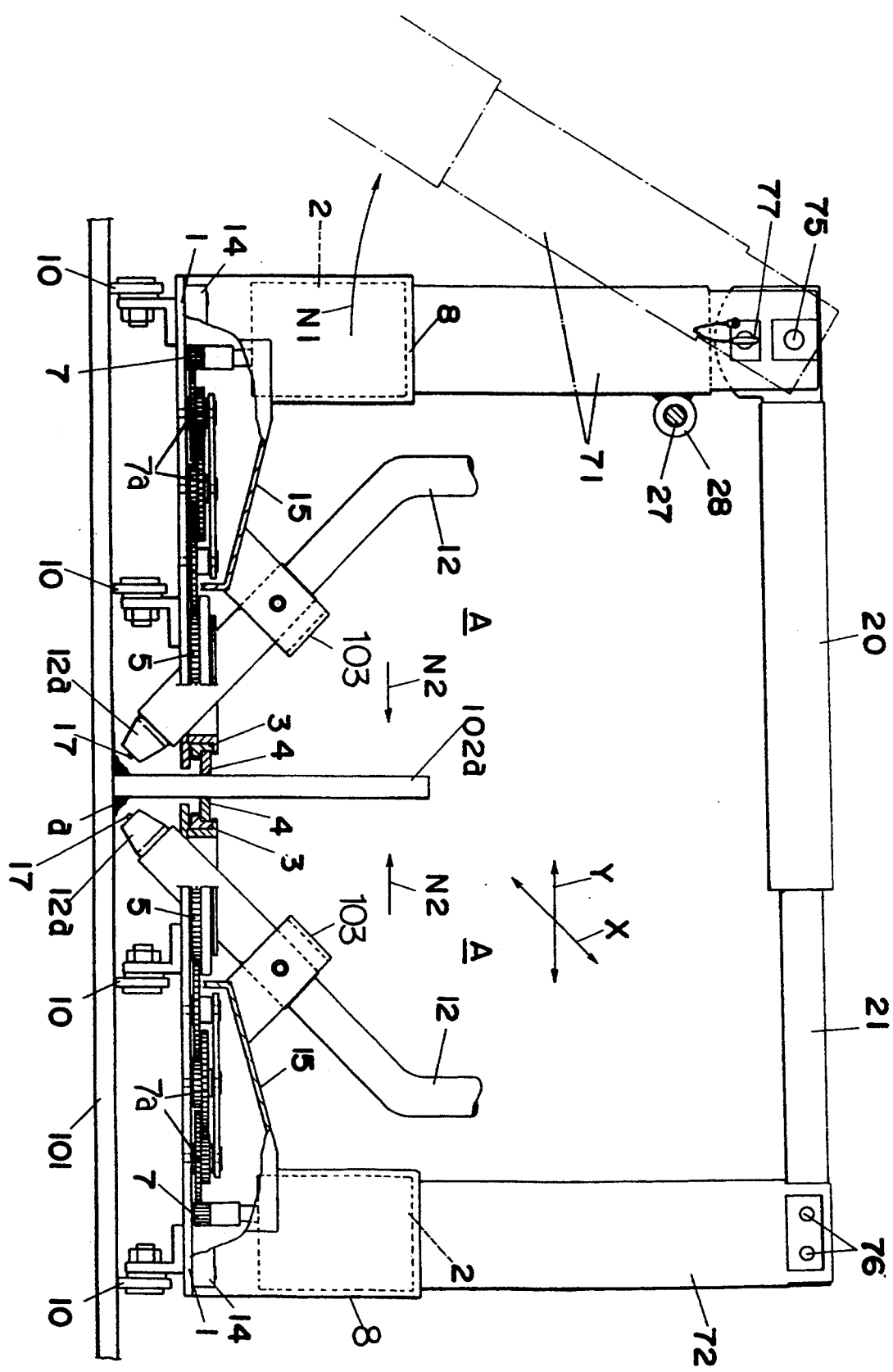
FIG. 5 is side views of the welding units of the invention.
Figure 6:
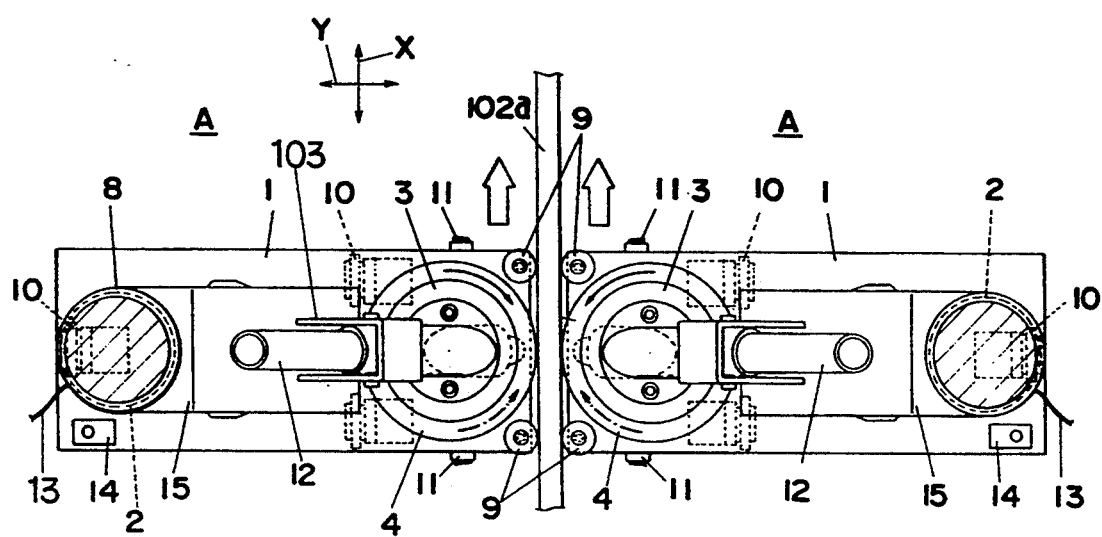
FIG. 6 is plan views of the welding units of the invention.

Supporters 71, 72 stand from within the cases 8 of the left and right welding units A as shown in FIGS. 4 and 5. At an upper part of the support 71, a cylinder 20 is pivoted by its rear part via a pin 75. Further, the front end of a rod 21 of the cylinder 20 is secured at the upper part of the support 72 via screws 76. The support 71 is detachably inserted with a locking stopper 77. It cannot be rotated around a pin 75 while the stopper 77 is inserted into the support 71, and only by removing can the stopper 77, the support 71 be opened outward by rotating in a clockwise direction N1 (see single-dotted lines in FIG. 5).

For setting the two welding units A on the bottom plate 101 as shown with the single-dotted lines in FIG. 5, the locking stopper 77 is taken off, and the left welding unit A is rotated clockwise N1 around the pin 75 toward the outside. Subsequently, the right welding unit A is grounded on the bottom plate 101, and the left welding unit A is rotated counterclockwise to be grounded on the bottom plate 101. The locking stopper 77 is inserted into the supporter 71 to lock the left welding unit A so as not to rotate around the pin 75, and the rod 21 of a cylinder 20 is brought back. Then, both units A are mutually drawn in as indicated arrows N2 so that left and right rollers 4 chuck the standing plate 102a. That is, the cylinder 20 serves to urge the left and right rollers 4 against the standing plate 102a for checking it.

If the switching parts 14 of the motors 2 are turned ON, the motors are driven so that the two units A move in the X direction along the standing plate 102a. It is of course also possible to set the units A to the standing plate 102a by only moving the rod 21 of the cylinder 20 back and forth, instead of rotating the units A clockwise N1 around the pin 75.

Guiding means for the welding units A will be explained. In FIG. 4, there are disposed two supports 25 on the bottom plate 101, on the upper ends of which grooved rollers 26 are mounted, and a guide rod 27 is bridged between the rollers 26 and 26. The guide rod 27 passes through a pipe 28 fixed at the upper part of the case 8 of the one welding unit A which moves thereby along the guide rod 27. The supports 25 may be positioned at desired parts on the plate 101.

The X-Y tables B will be explained with reference to FIGS. 1 to 3. In FIGS. 1 and 2, X directional rails 51 having an I-shape in cross section are laid on a floor; and Carriages 30 are placed on the rails 51, which are engaged with casters 31 to be rotated by the motors 32 equipped on the carriage 30. When the motors 32 are driven, the carriages 30 move on the rails 51 in the X direction. As seen in FIG. 2, between the rails 51 and 51, a receiver 50 is provided for placing the bottom plate 101 as one of objects to be welded, and the standing plates 102 are secured thereon by tack-weldings.

On the carriage 30, a supporter 33A stands as shown in FIG. 2, and another supporter 33B stands in opposition thereto. The caster 31 at the lower part of the supporter 33B is engaged with the rail 51. A Y-directional rail 37 having an I-shape in cross section is bridged on the left and right supporters 33A, 33B, and is engaged with casters 36 pivoted in a bracket 40 to be rotated by the motor 35. A frame 34 extending in the X direction is, as seen in FIG. 1, secured under the bracket 40. At the underside of the frame 34, a case 55 is provided within which a control box 56 and a supplier 57 of the electrode 17 (see FIG. 5) are furnished, and a spool 57a of the supplier 57 is coiled with the electrode 17. The control box 56 is arranged with an electric circuit for controlling the motors 32, 35.

A frame 38 is equipped on the rail 37 as shown in FIG. 1. Casters 39 pivoted at the end part of the frame 34 contact the underside of a frame 43 under the frame 38. Accordingly, when the motor 35 driven, the casters 36 rotate on the rail 37, and the case 55 moves in the Y direction. The moving table is not of course limited to the X-Y table B of the instant embodiment, but such one is sufficient which may cause the tables 6 to follow the movings of the welding units A, for example, cause to follow in the X direction only.

In FIG. 1, a shaft 68 is fixed at the front end of the frame 34, and has, at its lower end, a case 114 of the detector C detecting the moving directions of the welding units A, and also has a holder 67 of the cable 6. The detector C will be referred to in FIGS. 7 and 8.

Figure 7:
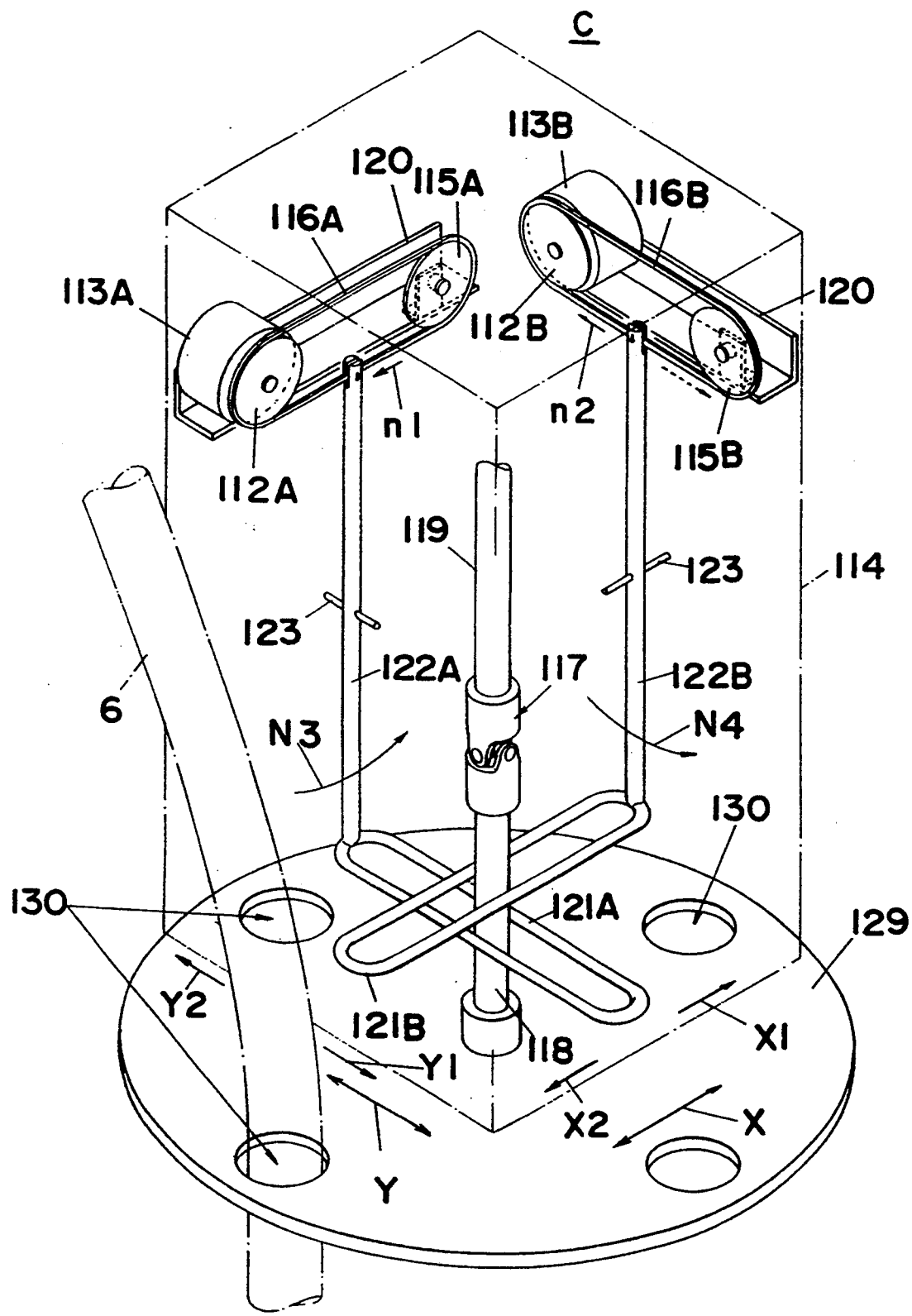
FIG. 7 is a perspective view of a detector according to this invention.

FIG. 7 shows two frames 120 mutually transverse in the case 114, and equipped with potentiometers 113A, 113B and sprockets 115A, 115B. Endless chains 116A, 116B are wound on the sprockets 115A, 115B and sprockets 112A, 112B provided on the sides of the potentiometers 113A, 113B.

A vertical shaft 119 stands at a center of the case 114, and is held at its upper end by a ceiling of the case 114 (FIG. 8) and turnably pivoted at its lower end with a shaft 118 via a universal joint 117.

Figure 8:
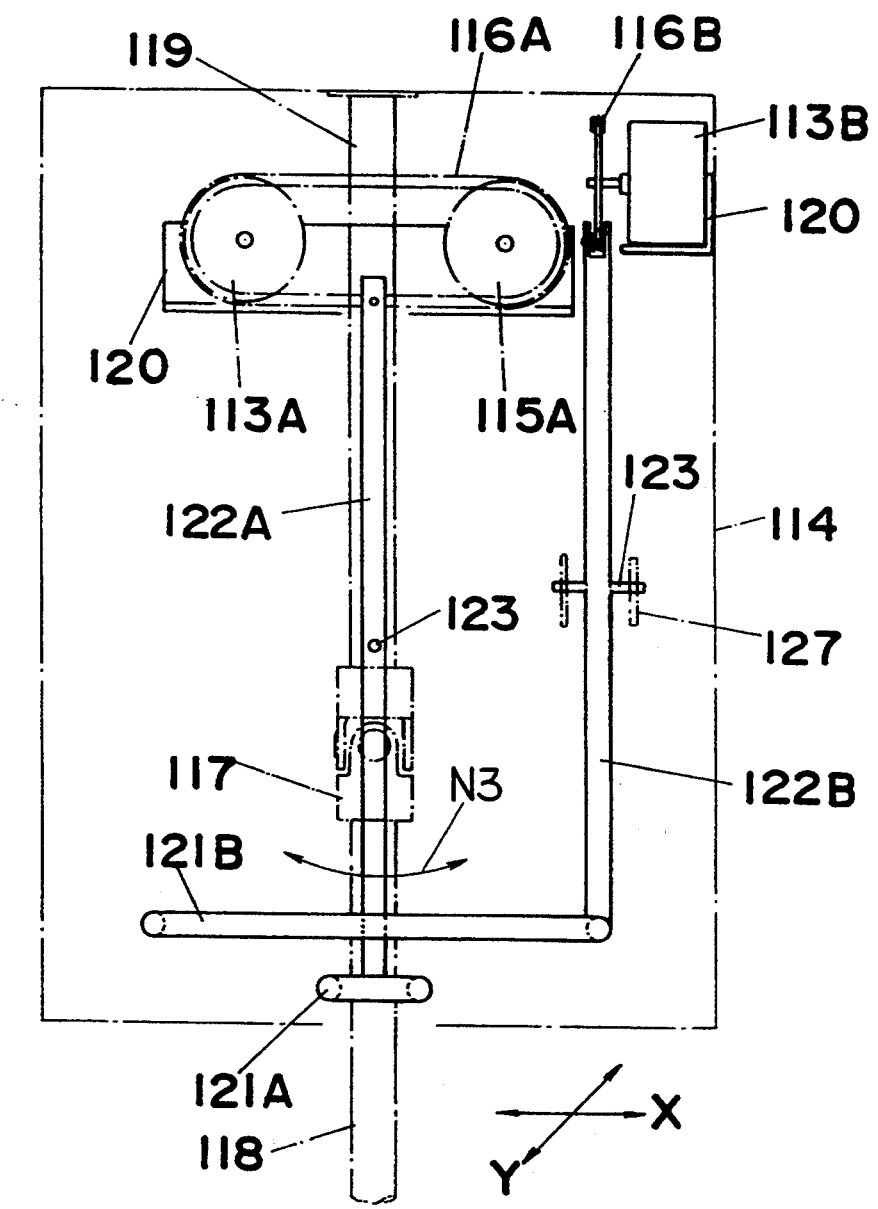
FIG. 8 is a side view of the detector of the invention.

In addition, the shaft 118 is kept by two elongated rings 121A, 121B which cross each other. Bars 122A, 122B extends upward from their ends to the endless chains 116A, 116B, and are pivoted at middle parts with pins 123 provided on an inside wall of the case 114. FIG. 8 shows pin 123 supported by a receipt 127 provided in the inside wall of the case 114. The shaft 118 is furnished at its lower end with a disc 129, and the cables 6 are inserted into holes 130 formed in the disc 129. When the welding units A move, the cables 6 are pulled and swayed by the units A, and the shaft 118 is also turned accordingly around the universal joint 117.

Figure 9:
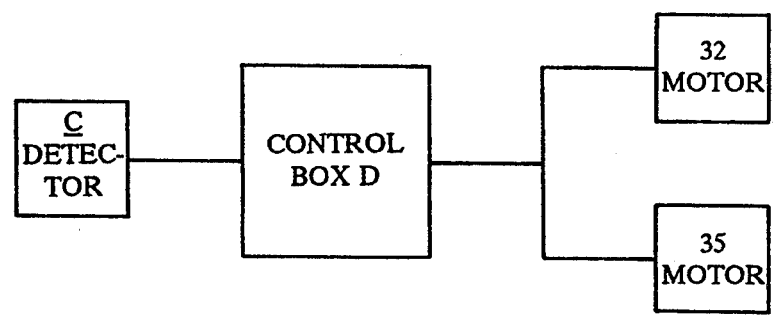
FIG. 9 is a block diagram of an electric circuit of the invention.

FIG. 9 shows a block diagram of an electric circuit wherein a detector C connected to a control circuit part D which is communicates with the motors 32, 35 of the X-Y tables B. The control circuit part D is provided in the control box 56, and controls the direction of rotation of the motors 32, 35 by signals issued from the detector C.

When the welding units A move in the X1 direction as shown in FIG. 3, the shaft 118 turns in the X1 direction, and the ring 121A also turns in the X1 direction as shown in FIG. 7. The potentiometer 113A that the bar 122A turns in an arrow N3 direction around the pin 123, and the chain 116A rotates in the direction of arrow n1, and the welding units A move in the X1 direction as shown.

When the welding units A move in the Y1 direction in FIG. 3, the shaft 118 also turns in the Y1 direction as shown, and the ring 121B also turns in the Y1 direction in FIG. 7. The potentiometer 113B then detects that the bar 122B turns in an arrow N4 direction, and the chain 116B rotates in the direction of arrow n2, and the welding units A move in the Y1 direction. By the same principle, when the welding units A move in the X2 or Y2 directions as shown in FIG. 1, the moving directions thereof are detected by the potentiometers 113A, 113B. The detector C detects the moving directions of the welding units A in such manners.

The instant welding apparatus is composed as stated above, and operations thereof will be referred to.

The left and right welding units A are placed on the bottom plate 101 as shown in FIG. 4, and the supporter 71 is locked with the stopper 77 to prevent rotation thereof. Subsequently, the rod 21 of the cylinder 20 is brought back to chuck the standing plate 102a between the left and right rollers 4 and 4. When the switches 14 of the units A are turned ON, the motors 2 are driven, and the rollers 4 rotate horizontally. Then, the welding units A move in the X direction along the standing plate 102a, and the welding is carried out on the connecting part (a) of the bottom plate 101 and the plate 102a by means of the torch 12. At this time, the guide rod 27 guides the moving of the unit A. When the limit switches 11 furnished at the sides of the units A contact the standing plate 102b, the motors 2 stop, and the torches 12 also stop. Thus, the welding is finished.

The rod 21 of the cylinder 20 is projected to release the chucking between the rollers 4 and the standing plate 102a, and at the same time the locking is released by removing the stopper 77. The left welding unit A is rotated clockwise N1 around the pin 23 as shown with the one-dotted line of FIG. 5, and the two welding units A are taken off. The weldings in the Y direction between the standing plate 102b and the bottom plate 101 are performed in the same way as mentioned above. By repeating these operations welding of, the bottom plate 101 and the standing plate 102 are effectuated.

For operating the welding by moving the welding units A in the X or Y directions, the cables 6 must be moved in the same directions to follow the movement of the units A. If the welding units A are moved in the X1 direction in FIG. 3, the cables 6 are pulled by the units A and swayed in the same direction X1, so that it is detected by the potentiometer 113A that the shaft 118 is also turned in the X1 direction as shown in FIG. 7, and the bar 122A is turned in the N3 direction. The motor 32 rotates normally to move the case 55 holding the cable 6 in the X1 direction.

Also when the shaft 118 turns in the X2 direction, the turning direction thereof is detected by the potentiometer 113A, and the motor 32 in reverse rotates, and the X-Y table B moves in the X2 direction as shown. When the units A move in the Y1 direction in FIG. 3, the shaft 118 turns in the Y1 direction as shown in FIG. 7. Then, the bar 122B turns in the N4 direction as shown, and this moving is detected by the potentiometer 113B, and the motor 35 rotates normally so that the case 55 moves in the Y1 direction. Also when the units A move in the Y2 direction in FIG. 3, this moving is detected by the potentiometer 113B in the same manner, and the motor 35 rotates in reverse. The cables 6 are pulled in the X or Y directions in accompany with the movement of the units A, the potentiometers 113A, 113B detect instantly the pullings thereof, and the cables 6 are made to follow the welding units A.

Figure 10:
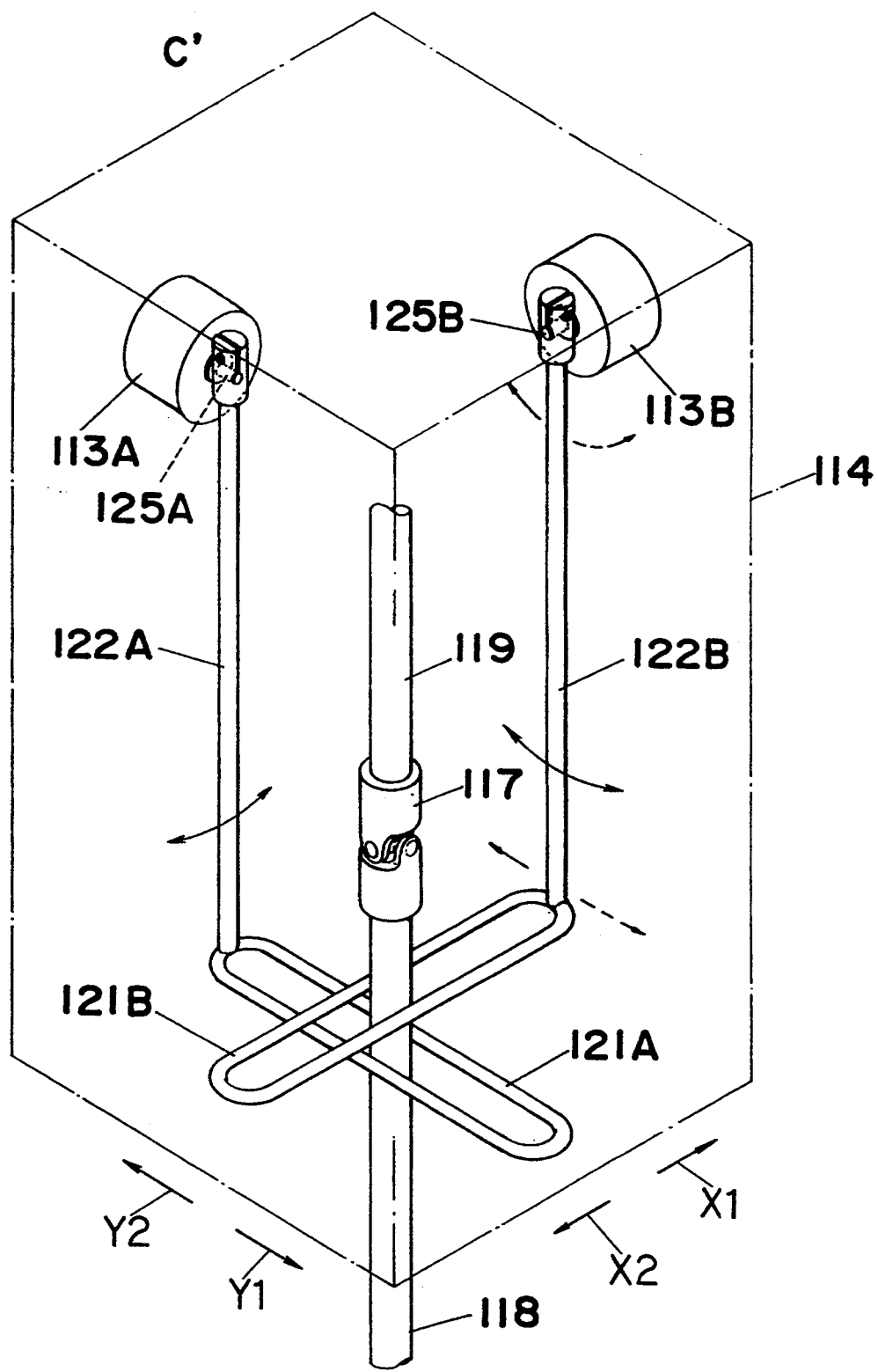
FIG. 10 is a perspective view of the detector of the invention.

FIG. 10 shows a detector C' of another embodiment wherein upper ends of bars 122A, 122B are pivoted on pins 125A, 125B which are provided at rotating centers of potentiometers 113A, 113B. Accordingly, when the shaft 118 is turned in the X or Y directions following the movings of the welding units A, the bars 122A, 122B turn in arrow directions, and the pins 125A, 125B rotate so that the moving directions of the units A are detected. Various types may be applied as the detector.

Figure 11:
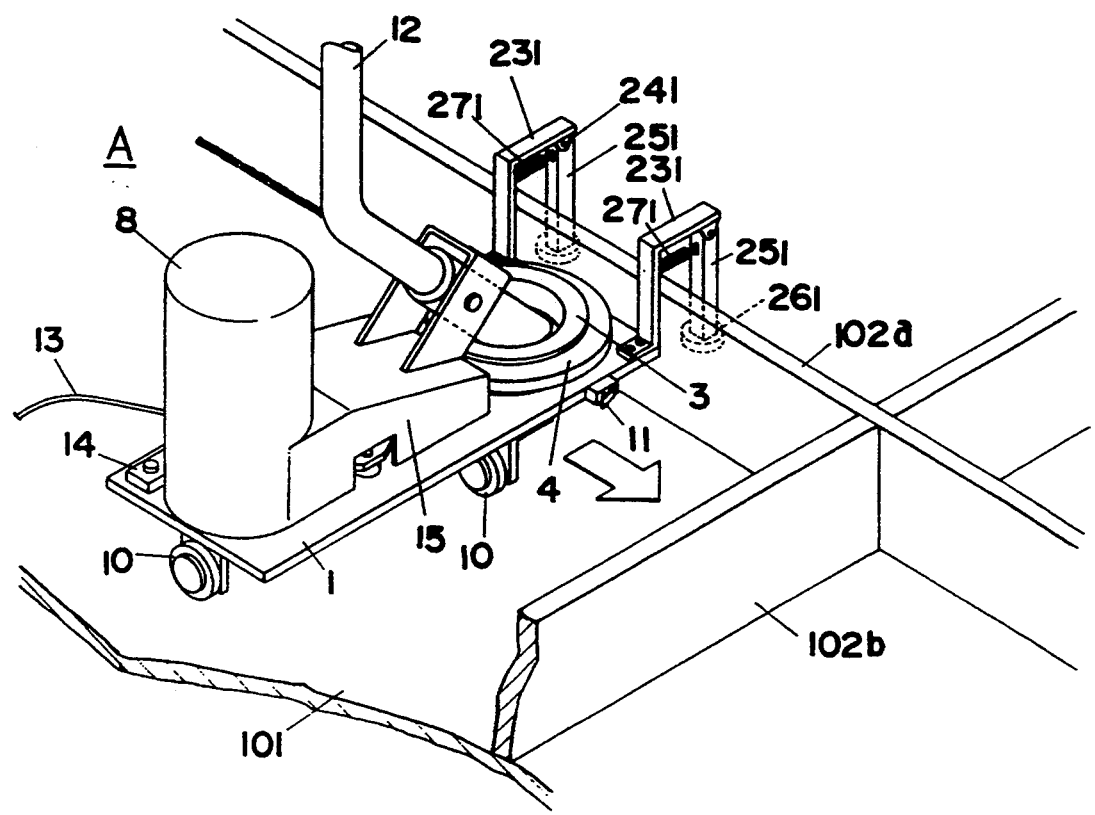
FIG. 11 is the perspective view of the welding unit of the invention.
Figure 12:
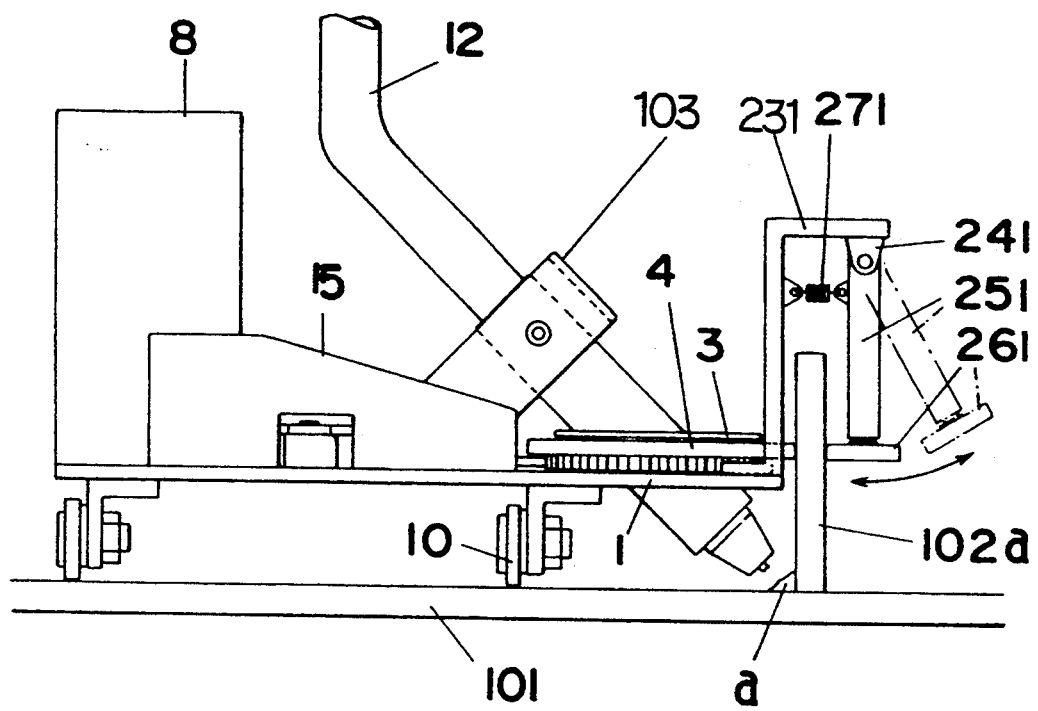
FIG. 12 is the side view of the welding unit of the invention.

FIGS. 11 and 12 show another manner of use the welding units A. In this case, one welding unit A is mounted on the bottom plate 101. Brackets 231 of reverse L-shape are provided at the both sides in the front ends of the base member 1, and bars 251 are pivoted via pins 241 at the front ends of the brackets 231. The bars 251 are pivotally furnished with rollers 261 at the lower ends thereof. The brackets 231 and the bars 251 are connected with coil springs 271. As shown with single-dotted lines in FIG. 12, the bar 251 is expanded outwardly by an operator's hand, and the welding unit A is mounted on the bottom plate 101. When the bar 251 is released from his hand, the standing plate 102a is chucked by the rollers 4 and 261 due to the spring force of the coil springs 271.

This welding unit A welds the connecting part (a) only at one side between the bottom plate 101 and the standing plate 102. The cable 6 is, though not shown, connected to the supplier 57 within the case 55 held by the X-Y table B. Using manner of this unit A shown is the same as those of the units A in FIGS. 4 to 6.

Figure 13:
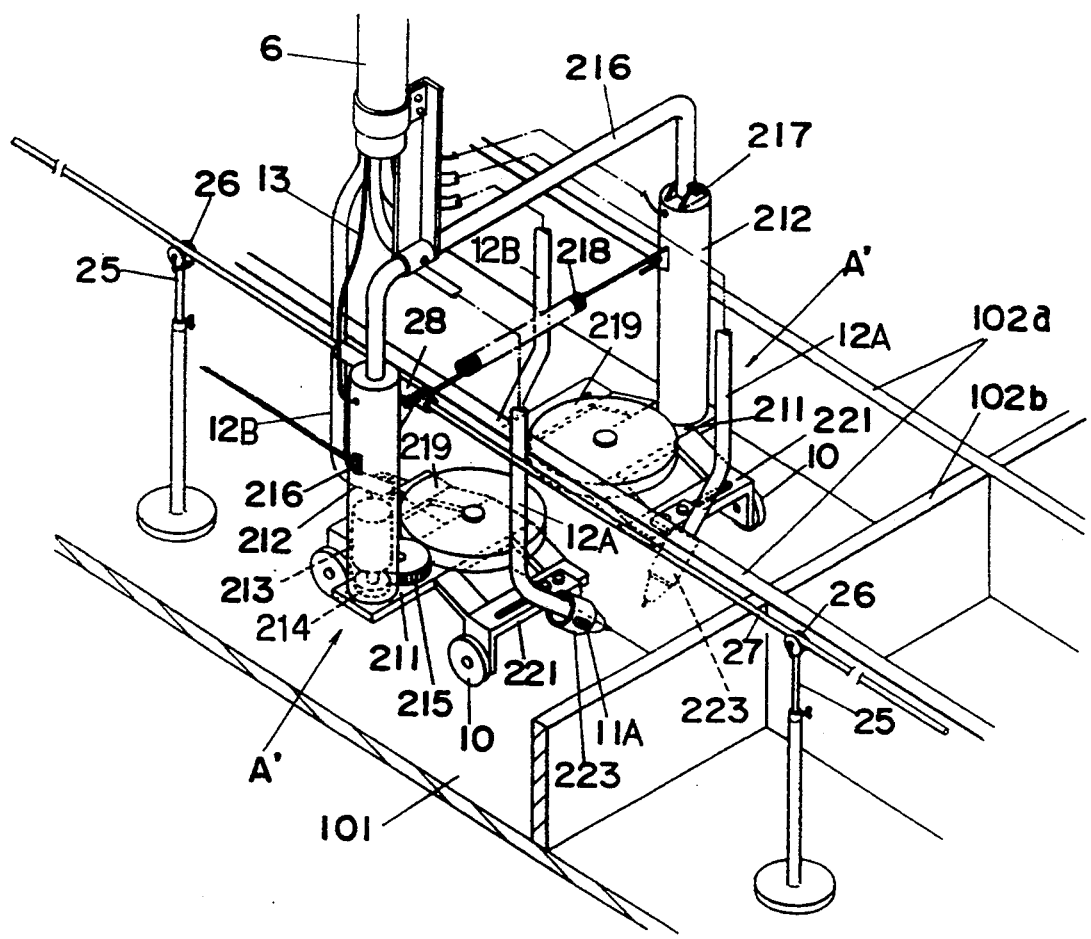
FIG. 13 is the perspective views of the welding units of this invention.

Welding units A' of another embodiment will be explained, referring to FIGS. 13 to 15. Cylindrical cases 212 stand at rear parts of base members 211, and a motor 213 is housed in the case 212 in one side. Rollers 219 are pivoted on the front ends of the base members 211. Gears 214 are pivotally mounted on rotating shafts of the motors 213, are and are meshed with gears 215 contacting on circumferences of rollers 219, When the motors 213 driven, the gears 214, 215 rotate, so that the rollers 219 rotate horizontally due to the friction between the roller 219 and the gear 215.

A case 212 of the left welding unit A' and a case 212 of the right welding unit A' are connected through an arm 216. The upper part of the left case 212 is secured to the arm 216, and the right case 212 is pivoted on the arm 216 with a pin 217. The left and right cases 212 are connected through a coil spring 218. Accordingly, the right case 212 is rotated around a pin 217, and the left and right rollers 214 chuck the standing plate 102a by the spring force of the coil spring 218.

Figure 15:
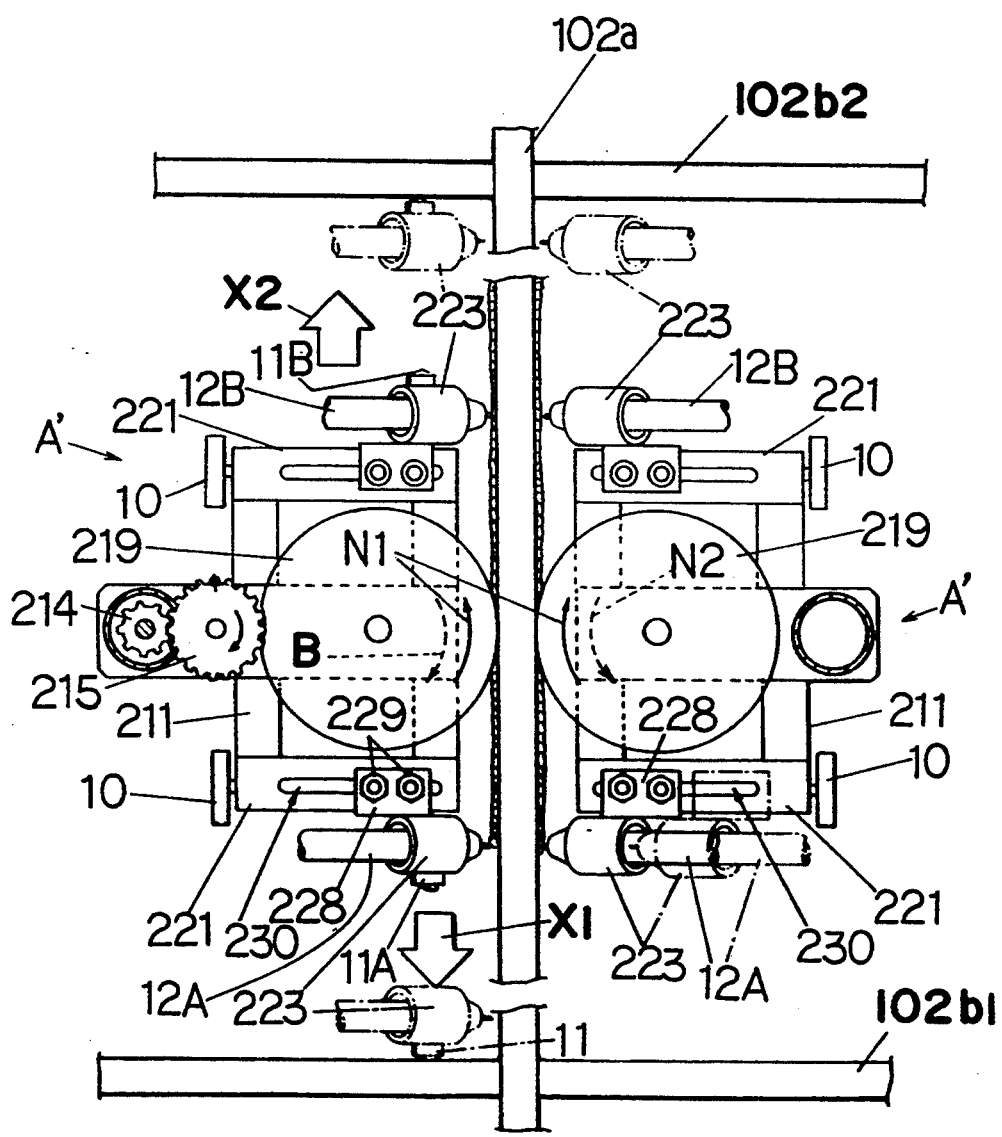
FIG. 15 is the plan views of the welding units of the invention.

Bed plates 221 are connected at both sides of the base members 211 as shown in FIG. 15. The bed plates 221 are attached with pipe-like holders 223 for holding the torches 12 (12A, 12B). That is, the present welding units A' have the two torches 12 at the both sides of the base members 211.

In FIG. 15, the holders 223 are provided to the bed plates 221 by attaching members 228 which are positioned within extending holes formed in the bed plates 221 by bolts 229. Therefore, the holders 223 slide the rollers 219 along the bed plates 221 in response to the thickness of the standing plate 102 (see the dotted lines in FIG. 15). The limit switches 11 are furnished at the sides of the holders 223.

Figure 14:
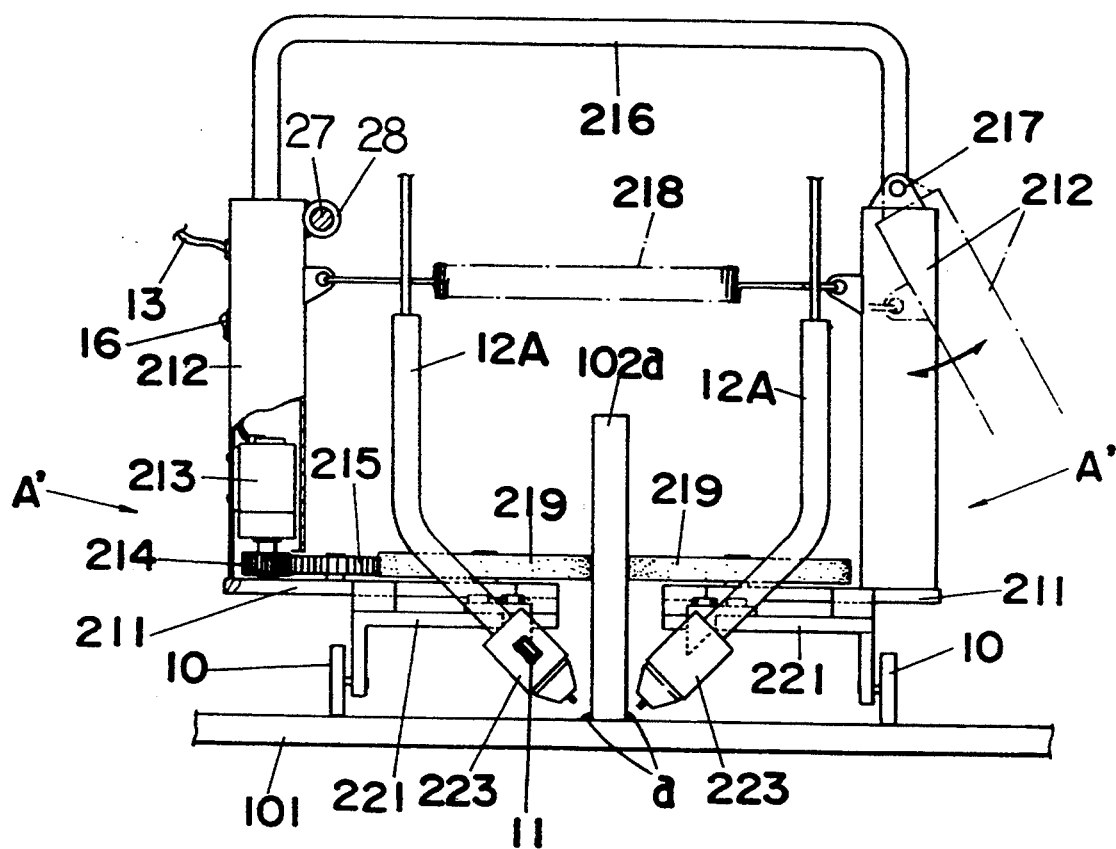
FIG. 14 is the front views of the welding units of this invention.

As shown in FIG. 14, when the standing plate 102a is chucked by the left and right rollers 219, the torches 12 face the connecting parts (a) between the bottom plate 101 and the standing plate 102a. When the switch 216 (FIG. 13) is turned ON, the motors 213 drive, and in as shown FIG. 15 the rollers 219 rotate in the arrow N1 direction. Then, the welding units A' move in the X1 direction on the bottom plate 101 along the standing plate 102a, and one torch 12A welds the connecting part (a) between the bottom plate 101 and the standing plate 102a. At this time, the other torch 12B is at rest.

When the limit switch 11A contacts the standing plate 102b1 (see the single dotted line in FIG. 15), the motors 213 begin to rotate, and the rollers 219 rotate in reverse in the arrow N2 direction. The welding units A' start to move in the X2 direction, and concurrently the other torch 12B is activated, while the other torch 12A is stopped and the welding is carried out by the torch 12B. When the limit switch 11B contacts the standing plate 102b2, the torch 12B and the motor 213 stop, and all works are finished. For setting the instant welding units A' on the bottom plate 101 or removing therefrom, the right case 212 is extended outside as shown with the single dotted line in FIG. 14. The cables 6 of the welding apparatuses A' are also held on the X-Y table B, and the apparatuses A' are used in combination with the X-Y table.

According to the present invention as explained above, the connecting parts (a) between the bottom plate 101 and the standing plates 102 may be welded as moving the welding units A, A' in the X or Y directions. The above, and other objects, features and advantages of the present invention will become apparent from the following description read in conjunction with the accompanying drawings, in which like reference numerals designate the same elements.

What is claimed is:

1. A welding unit comprising:
   rollers for contacting plates and which rotate;
   a pushing means which urges the rollers against the plates;
   wheels which run on a bottom plate;
   torches which carry out weldings on connecting parts between the bottom plate and the plates;
   motors which drive the rollers to cause the torches to move along the connecting parts;
   said rollers each defining a central opening therethrough;
   each of said torches passing through said central opening of a respective one of said rollers.

2. The welding unit as claimed in claim 1, further comprising:
   means for guiding said welding units to move along said plates.

3. The welding unit as claimed in claim 2, wherein said means for guiding includes;
   a horizontal guide rod; and
   supporters including means for standing on the bottom plate and further including means for supporting said horizontal guide rod.

4. The welding unit as claimed in claim 1, further comprising:
   base members;
   the rollers being incorporated in said base members and
   the torches being held at outer sides of said base members.

5. The welding unit as claimed in claim 1, wherein:
   said welding units are two; means for connecting said welding units to one another;
   said plate is chucked by said rollers provided in the welding units; and
   the weldings are concurrently carried out on connecting parts between said plate and the bottom plate by means of the torches provided in the welding units.

6. The welding unit as claimed in claim 5, wherein said means for connecting is an arm.

7. The welding unit as claimed in claim 1, wherein said pushing means is a cylinder.

8. The welding unit as claimed in claim 1, wherein said pushing means is a spring coil.

9. A welding unit comprising:
   rollers which contact plates and rotate horizontally;
   a pushing means which urges the rollers against the plates;
   wheels which run on a bottom plate;
   torches which carry out weldings on connecting parts between the bottom plate and the plates;
   motors which drive the rollers to cause the torches to move along the connecting parts;
   there being provided moving tables which hold cables extending from said welding units, said moving tables being driven by the motors to move horizontally;
   detectors which detect the moving directions of said welding units; and
   a control circuit part which is controlled by detecting signals issued from the detector to control driving motors of said moving tables for causing said moving tables to follow the movings of the welding units.

10. The welding unit as claimed in claim 9, wherein said moving tables are X-Y tables moving in at least one of X and Y directions.

11. A unit for welding connecting parts between a bottom plate and at least one standing plate arranged in angular relation to said bottom plate, comprising:
   a plurality of wheels in rotatable contact with said bottom plate;
   a pair of rollers, including means for rotatably mounting said pair of rollers to said unit;
   said pair of rollers disposed one on each of opposite sides of said at least one standing plate;
   means for urging said pair of rollers into contact with said at least one standing plate;
   at least one of said pair of rollers defining a central opening therethrough;
   at least one torch positioned on a side of said at least one standing plate;
   said at least one torch passing through said central opening; and
   driving means for imparting rotational movement to said pair of rollers whereby said unit for welding is propelled along said standing plate during a welding operation.

12. The unit for welding according to claim 11 further comprising:
   a moving table including means for holding cables;
   drive means for driving said moving table;
   means for detecting a direction of movement of said unit; and
   means for controlling said drive means responsive to said means for detecting to control movement of said table to follow movement of said unit for welding.

13. A unit for welding connecting parts between a bottom plate and at least one standing plate arranged in angular relation to said bottom plate, comprising:
- a plurality of wheels in rotatable contact with said bottom plate;
- a pair of rollers;
- means for rotatably mounting said pair of rollers to said unit for welding;
- said pair of rollers disposed one on each of opposite sides of said at least one standing plate;
- means for urging said pair of rollers into contact with said at least one standing plate;
- at least one of said pair of rollers defining a central opening therethrough;
- at least one torch positioned on a side of said at least one standing plate;
- said at least one torch passing through said central opening; and
- driving means for imparting rotational movement to at least one of said pair of rollers whereby said unit is propelled along said standing plate during a welding operation.

14. A unit for welding connecting parts between a bottom plate and at least one standing plate arranged in angular relation to said bottom plate, said unit comprising:
- a plurality of wheels in rotatable contact with said bottom plate;
- first and second base members each having outermost sides correspondly facing each of two directions of travel of said unit for welding;
- first and second rollers, including means for rotatably mounting each of said first and second rollers to a respective one of said base members;
- said first and second rollers disposed one on each of opposite sides of said at least one standing plate;
- means for urging said first and second rollers into contact with said at least one standing plate;
- first and second torches carried at each of said outermost sides of said first base member; and
- third and fourth torches carried at each of said outermost sides of said second base member.

15. The unit for welding according to claim 14 further comprising:
- means for activating ones of said torches located on ones of said outermost sides corresponding to a particular direction of travel of said two directions of travel, and for deactivating ones of said torches located on ones of said outermost sides opposite to said particular direction of travel of said two directions of travels.

16. A unit for welding connecting parts between a bottom plate and at least one standing plate arranged in angular relation to said bottom plate, said unit comprising:
- at least one roller, including means for rotatably mounting said at least one roller to said unit;
- said at least one roller disposed on a side of said at least one standing plate;
- means for urging said at least one roller into contact with said at least one standing plate;
- said at least one roller defining a central opening therethrough;
- a torch positioned on said side of said at least one standing plate;
- said torch passing through said central opening of said at least one roller; and
- driving means for imparting movement of said unit along said standing plate during a welding operation.

17. A welding apparatus comprising:
- first and second rollers;
- means for chucking a plate between said first and second rollers;
- means for driving at least one of said first and second rollers;
- means for permitting said first and second rollers to move with respect to said plate;
- welding means, movable with said first and second rollers, for performing a welding operation on said plate;
- means for detecting a motion of said welding means;
- at least one cable connected to said welding means
- a table;
- said at least one cable being connected to said table; and
- means, responsive to said means for detecting, for driving said table in relation to said motion.

* * * * *